(12) United States Patent
Wichowski et al.

(10) Patent No.: US 12,146,762 B1
(45) Date of Patent: Nov. 19, 2024

(54) TIME SYNCHRONIZED OBJECT TRACKING SYSTEM

(71) Applicant: The United States of America as represented by the Secretary of the Navy, Newport, RI (US)

(72) Inventors: Keith C Wichowski, Portsmouth, RI (US); Zachary D Sawyer, North Kingstown, RI (US); Daniel T Savaria, Bristol, RI (US); Patrick B Ryll, Tiverton, RI (US)

(73) Assignee: The United States as represented by the Secretary of the Navy

( * ) Notice: Subject to any disclaimer, the term of this patent is extended or adjusted under 35 U.S.C. 154(b) by 185 days.

(21) Appl. No.: 18/098,824

(22) Filed: Jan. 19, 2023

(51) Int. Cl.
*G01S 13/87* (2006.01)
*G01C 21/00* (2006.01)
*G06F 16/29* (2019.01)

(52) U.S. Cl.
CPC .......... *G01C 21/3841* (2020.08); *G01S 13/87* (2013.01); *G06F 16/29* (2019.01)

(58) Field of Classification Search
CPC ...... G01C 21/3841; G06F 16/29; G01S 13/87
See application file for complete search history.

(56) References Cited

PUBLICATIONS

U.S. Navy, "Content from AMITC Site", Captured Circa Jan. 25, 2019. Material shows various functionality of software incorporating the claimed invention. The claimed invention is not disclosed in this release.
Farley, Susan, "Topside Delivers Better Command and Control for Unmanned Systems," Future Force, vol. 5, No. 1, (2018) pp. 16-19. Gives overview of software incorporating the claimed invention. The claimed invention is not disclosed in this release.
Palau Monitoring, Control, and Surveillance Plan Workshop, "Monitoring, Control, and Surveillance," (Circa 2016) p. 27. Discloses use of a timeline for display of system interactions. The invention is not disclosed as claimed.

*Primary Examiner* — Mathew Franklin Gordon
(74) *Attorney, Agent, or Firm* — James M. Kasischke; Michael P. Stanley; Jeffry C. Severson

(57) ABSTRACT

An object tracking system includes objects being tracked that have a communication means. The objects can be in either periodic or continuous communication. A receiver is capable of receiving data from the objects. A processor and database are provided joined to the receiver. The processor updates the database with the received positional data, and linked time data for each object. The processor and database are also capable of sorting the historic positional data, planned positional data, and current positional data by the time data linked to the position data to generate sorted positional data. A display is joined to the processor to receive and display the sorted positional data and linked time data.

18 Claims, 2 Drawing Sheets

TIME SYNCHRONIZED OBJECT TRACKING SYSTEM

STATEMENT OF GOVERNMENT INTEREST

The invention may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to an apparatus for viewing the position and status of vehicles and static objects.

(2) Description of the Related Art

Previously vehicles and static platforms were controlled and monitored through many different systems. Very often these vehicles and platforms are associated with proprietary signal formats and software. Incompatibilities among signal formats and types prevent monitoring the vehicles contemporaneously with receipt of positional data.

Vehicles and platforms of different types have different physical communication characteristics imposed by their operating environments. Unmanned aerial vehicles and drones can be in constant contact with an operational center because of their presence in the air. Unmanned undersea vehicles (UUVs) are generally out of contact with the operational center during mission performance. UUVs typically can only communicate when surfaced. Satellites may be out of communication range during portions of their orbits. Correlating information received from various types of sources upon communication presents a problem when monitoring different types of systems.

Given the different types of systems and different communication stream displaying communications provides a significant problem.

Thus, it is desirable to provide a system for combining signals from various vehicles and platforms for consistent centralized display.

SUMMARY OF THE INVENTION

It is a first object of the present invention to provide a common system for displaying data from a plurality of different vehicles and platforms.

Another object is to display data from different vehicles and platforms on the same display.

Yet another object is display data received at different times on the same timeline.

Accordingly, there is provided an object tracking system which includes objects being tracked that have a communication means. The objects can be in either periodic or continuous communication. A receiver is capable of receiving data from the objects. A processor and database are provided joined to the receiver. The processor updates the database with the received positional data, and linked time data for each object. The processor and database are also capable of sorting the historic positional data, planned positional data, and current positional data by the time data linked to the position data to generate sorted positional data. A display is joined to the processor to receive and display the sorted positional data and linked time data.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

The system disclosed herein provides for the management of autonomous vehicles, sensors, and spatially relevant data over a wide range of mission applications. The system enables users to plan operational missions, collect relevant feedback while controlling autonomous vehicles in a real-world environment, and log mission relevant data for analysis. The system includes a graphical user interface for display of mission parameters and access to a variety of analytical tools. The system is embodied as a standalone software framework on a processor which controls the implementation of plugins or software development kits. This allows the system to be adaptable to a wide range of missions and associated autonomous vehicle implementations. The framework supports the integration of datasets and specifically tasked software and database structures in a way that enhances and streamlines mission planning, execution, and subsequent data analysis. Mission support includes tasking such as anchoring, surfacing, communications, deploying and recovering a payload, path prediction and planning, and many other mission activities. Advantages to the system include adaptability by developers to a wide range of vehicles, mission types, and data management applications, stable networked and peer-to-peer operations, and data analysis and display.

Figure 1:
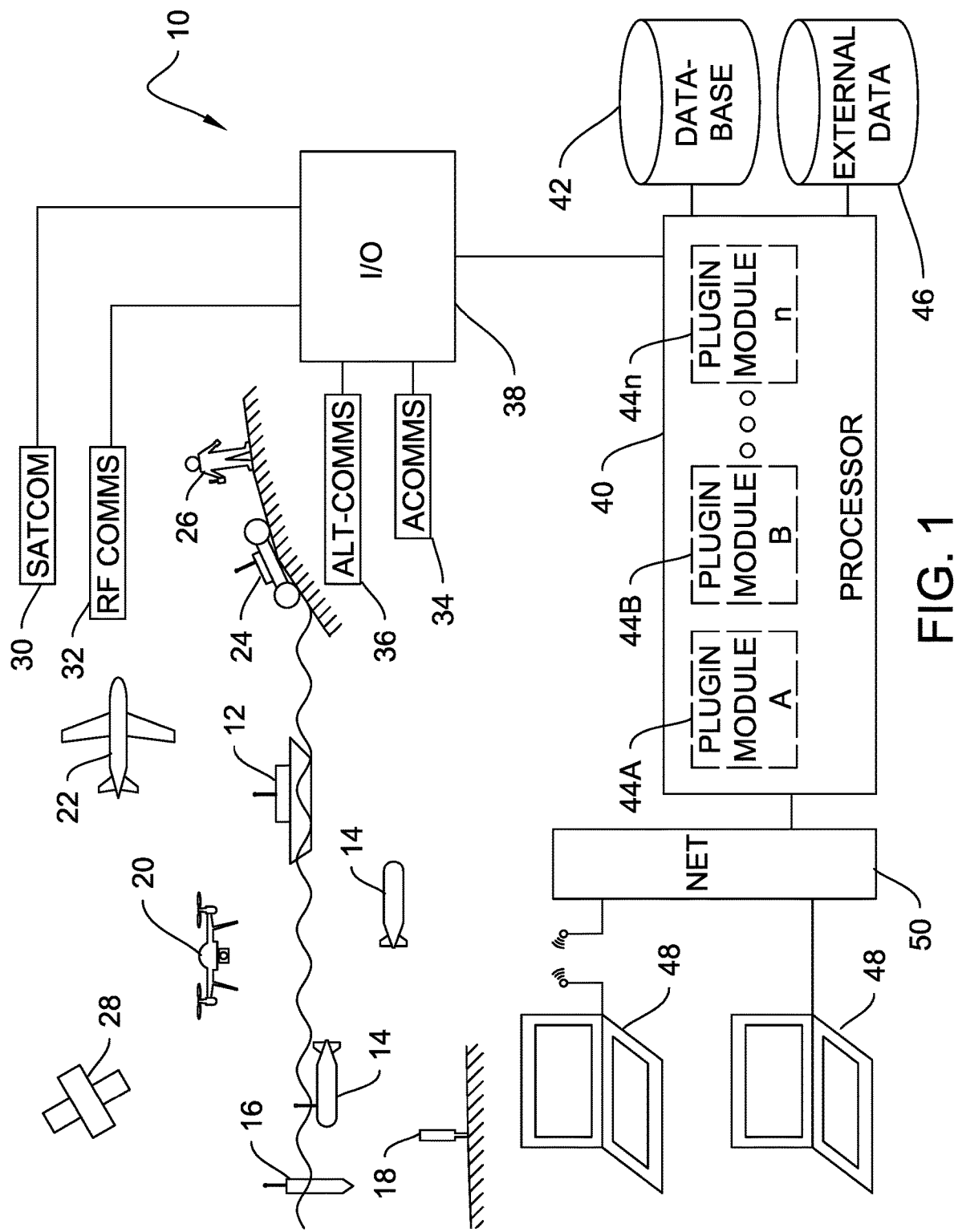
FIG. 1 is a diagram of generalized embodiment.

A generalized embodiment of the system is shown in FIG. 1. The system 10 can track many different kinds of vehicles and objects. These include unmanned surface vehicles 12, unmanned underwater vehicles 14, buoys 16, underwater emplacements 18, unmanned aerial vehicles 20, aircraft 22, surface vehicles 24, individuals 26, and satellites 28. Collectively these are referred to as objects. Communication with the objects can be by satellite receiver 30, radio receiver 32, acoustic communications receiver 34 and other communications receivers 36. Other communications receivers 36 can be above and/or below the surface. The receiver communicating with the object is joined to an input/output interface 38 which formats the communication and distributes it on a network.

The objects have different communications styles that must be accounted for by the system 10. Some objects such as surface vehicles 12, buoys 16, unmanned aerial vehicles 20, and individuals 26 can be in constant communication with the transceiver. These can stream an object identifier, positional data, and other data in real time and are called streaming objects in this disclosure. The positional data can be linked to a time when it is sent or when it is received. (This is dependent on the type of communication and the need for accuracy.) Many other objects such as unmanned underwater vehicles 14, underwater emplacements 18, and satellites 28 can be unable to communicate for various reasons. For example, an unmanned underwater vehicle 14 may not be able to send data until it surfaces. A satellite may not be in communication range until it comes over the horizon. These are termed periodic objects in this disclosure. These periodic objects log positional data and linked time data while they are unable to communicate. The periodic object sends an object identifier, compiled positional data, linked time data, and other data when communications are available.

Positional data is generally data about the location of the object. This may include latitude, longitude, and elevation data, such as altitude and depth. The positional data can be based on a vector, fixed or other coordinate system. The time data records the time when the positional data was obtained.

The other data being sent by the objects can include data related to the operational condition of the object and the surrounding environment. Operational condition data can include information related to power level, speed, operating temperature, and other parameters related to vehicle performance. Environmental data can include data such as water temperature, wind, barometric pressure, and other instrument data. Streaming objects, periodic objects, and monitoring objects can provide these types of data.

Monitoring objects can provide data related to observation of other items in the environment. This data can include data about external objects such as biological objects like whales, surface craft, undersea craft, aircraft, and the like. This observational data is typically vector data from sonar and radar that indicates data characteristics, time, and direction.

The input/output interface 38 is in communication with a processor 40. Processor 40 is joined to a database 42 for receiving information about types of objects, planned object positional data and times, and historic positional data and times. Database 42 can also have planned positional and planned time data for objects. Time linked environmental data can also be stored in the database.

Plugin modules 44A, 44B and 44n, associated with the characteristics of each object, are programmed in processor 40. If objects have the same characteristics, they can be associated with the same plugin module. When processor 40 receives data from interface 38, the data includes an object identifier which is referenced in the database. The object identifier reference indicates the associated plugin module. The plugin module processes the received data into object positional data with linked time data, compiled positional data with linked time data, and environmental data. Using the associated plugin module, processor 40 updates the database 42 with the received data.

Processor 40 can also be programmed to resolve vector data from external objects. Using a tracking algorithm, as known in the art, vector sensor data can be resolved into positional data for the external objects. The associated time data is the data when the vector data was obtained as modified by any travel time for the sensor data.

External data 46 can also be joined to provide positional data and times to processor 40 that does not originate directly from one of the objects being tracked. External data 46 can be automatic dependent surveillance-broadcast (ADS-B) data from aircraft or air traffic control information and automatic identification system (AIS) and vessel traffic services (VTS) data for ships. This can also be environmental data such as meteorological and oceanographic data concerning winds and currents.

Processor 40 can sort the all of the various forms of positional data by linked time for display on one or more display device 48. This data can be filtered by a variety of characteristics including data source, historical data, planned data, and real data. The data can be limited geographically. The display devices can be joined by a network 50 or wirelessly.

Figure 2:
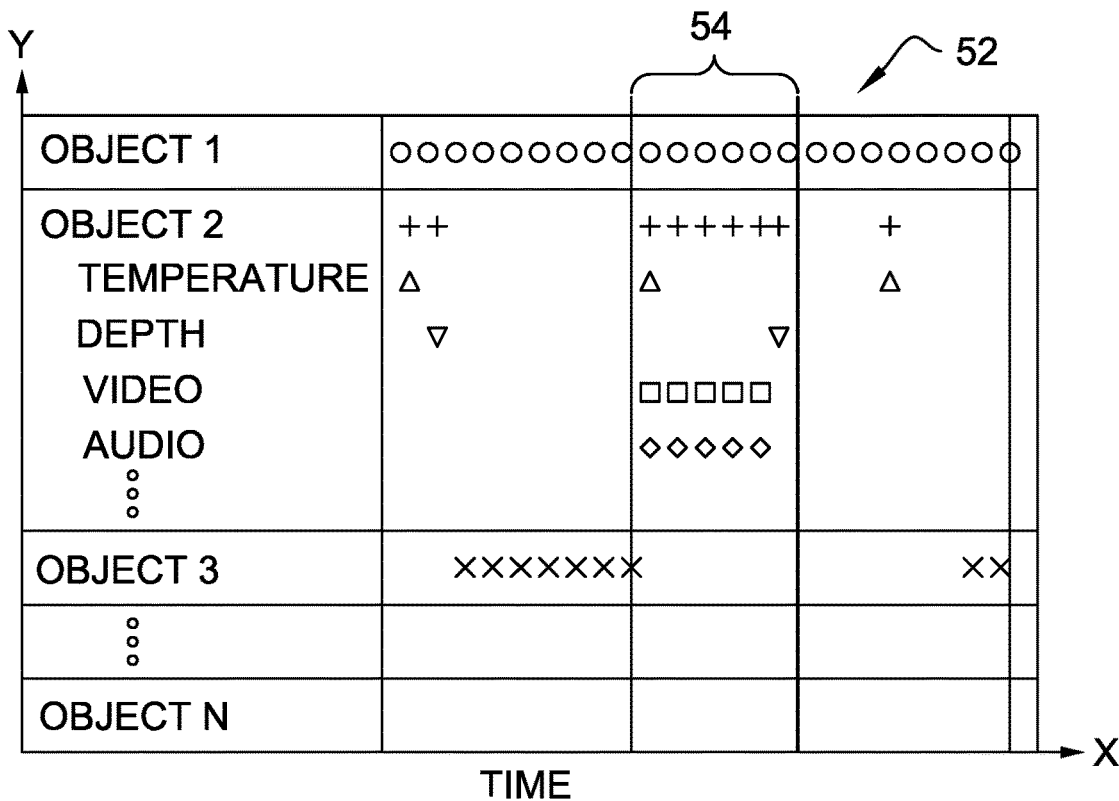
FIG. 2 is a diagram showing aligned data streams.

After aligning the data by linked time, data streams can be displayed as a timeline 52 such as shown in FIG. 2. In FIG. 2, the Y axis provides a list of source objects and the X axis indicates time. Data markings "+", "Δ", "□", "○", "◊", and "∇" indicate the presence of data at that time period. Positional data is indicated in the row with the object label. Various environmental and signal data can also be indicated. For example, in time segment 54, object 1, a streaming object, has a constant stream of positional data. Object 2 has positional data, temperature data, depth data, video data, and audio data. Object 2 is a periodic object as shown by the gaps in data transmission. Of course various different identifiers and colors can be used to distinguish the different data streams. The object listing can be sorted in a variety of criteria including name, most recent communicating, nearest to an object, user selection, or the like.

Figure 3:
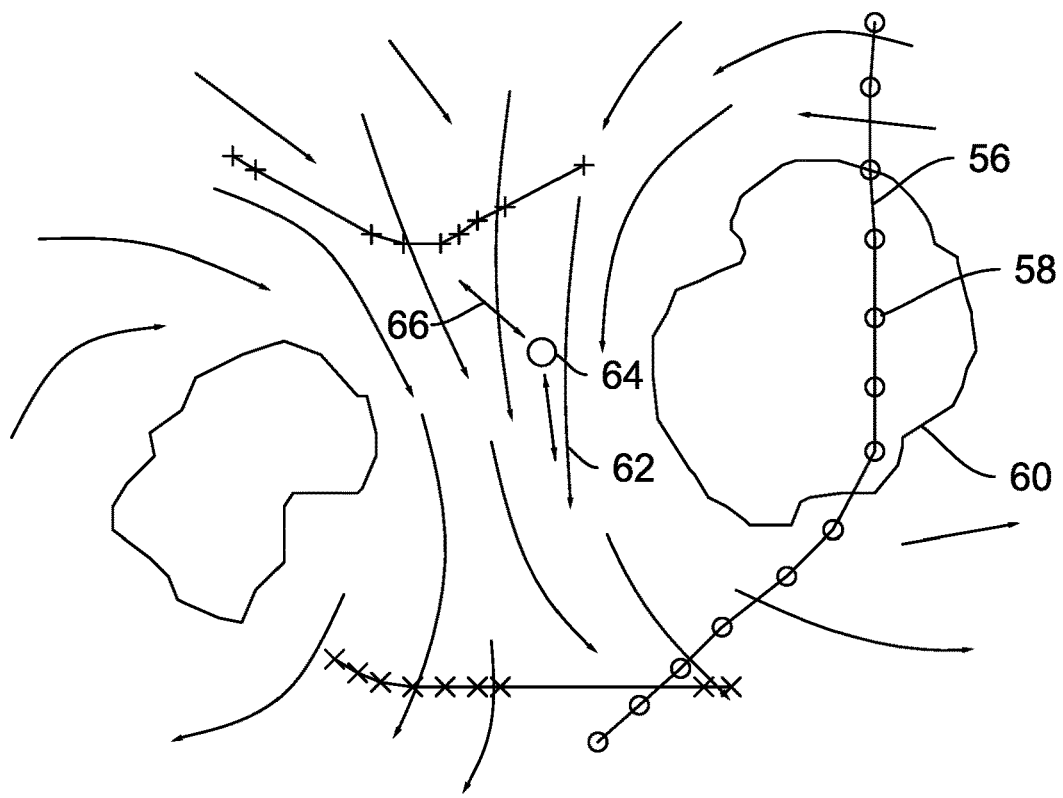
FIG. 3 is a diagram showing positional data as a display map.

FIG. 3 shows display of positional data as a map. Position of each object is given on track such as 56. Tracks can be identified with a particular object by the data marking. The most current data marking can be highlighted by having a different appearance such as by blinking, having a different color or being filled. Track 56 has circles 58 as data markers. The map display of FIG. 3 also shows geographic features 60 and environmental features 62 such as currents. Construction of these features can be by data from the database 42 or the external data 48. Tracks can be constructed from external positional data, planned positional data, actual positional data, constructed tracks from external objects or the like. Monitoring objects 64 can be shown with vectors 66 indicating the direction of received signals. Vector 66 length or color can be related to the range or signal strength, if available.

In view of this, it will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modifications and variations are possible in light of the above teaching. Such modifications and variations that may be apparent to a person skilled in the art are intended to be included within the scope of this invention as defined by the accompanying claims.

What is claimed is:

1. An object tracking system comprising:
 a plurality of objects being tracked wherein the objects each have a communication means and comprise streaming objects that continually provide an object identifier, positional data and linked time data, and periodic objects that periodically provide an object identifier, compiled positional data and linked time data through the communication means;
 a receiver capable of receiving the object identifier, positional data, and linked time data from the communication means on said plurality of objects;

a database capable of storing a plurality of object types, historic positional data and historic time data associated with each object, planned positional data and planned time data associated with each object;

a processor joined to said receiver and said database, said processor being capable of updating the database with the received positional data, and linked time data for each object and capable of sorting the historic positional data, planned positional data, and current positional data by the time data linked to the position data to generate sorted positional data; and a display joined to the processor to receive and display the sorted positional data and linked time data.

2. The apparatus of claim 1, wherein said plurality of objects provide object condition data through the communication means.

3. The apparatus of claim 1, wherein the positional data includes elevation data.

4. The apparatus of claim 1, wherein said plurality of objects being tracked further comprises monitoring objects that each have a communication means and periodically provide an object identifier, compiled positional data and linked time data, and compiled environmental data through the communication means.

5. The apparatus of claim 4, wherein the compiled environmental data comprises meteorological data.

6. The apparatus of claim 4, wherein the compiled environmental data comprises oceanographic data.

7. The apparatus of claim 4, wherein the compiled environmental data comprises signal data and bearings to sources proximate to the monitoring object.

8. The apparatus of claim 7, wherein the signal data is electromagnetic data.

9. The apparatus of claim 7, wherein the signal data is acoustic data.

10. The apparatus of claim 7, wherein said processor has a tracking routine capable of resolving the bearings to sources to source positional data, the source positional data being associated with linked time data from the compiled environmental data, said processor being capable of incorporating the source positional data in the sorted positional data.

11. The apparatus of claim 10, wherein the display shows sorted positional data and linked time data as a plurality of tracks on a map.

12. The apparatus of claim 1, wherein the display shows sorted positional data and linked time data as a plurality of tracks on a map.

13. The apparatus of claim 12, wherein the display shows geographic features on the map.

14. The apparatus of claim 13, wherein the display shows environmental conditions on the map.

15. The apparatus of claim 1, wherein the display shows sorted position data and linked time data as a plurality of timelines, with one timeline associated with each object.

16. The apparatus of claim 15, wherein each timeline indicates the times when communications were received from the object associated with the timeline.

17. The apparatus of claim 1, wherein said processor is joined to external data sources to receive external positional data and linked time data, said processor being capable of updating the database with the received external positional data and linked time data for each object and capable of sorting the external positional data, the historic positional data, planned positional data, and current positional data by the time data linked to the positional data.

18. The apparatus of claim 1, wherein said processor has a plurality of plugin data packages, each plugin data package associated specifically with one type of said plurality of objects.

* * * * *